T. GRISSINGER.
SLEIGH-RUNNERS FOR WAGONS.

No. 188,621. Patented March 20, 1877.

WITNESSES:
James C. McGowan,
Stury B. Ladd

INVENTOR: Theodore Grissinger
By Paine and Grafton
Attorneys.

UNITED STATES PATENT OFFICE.

THEODORE GRISSINGER, OF MECHANICSBURG, PENNSYLVANIA.

IMPROVEMENT IN SLEIGH-RUNNERS FOR WAGONS.

Specification forming part of Letters Patent No. 188,621, dated March 20, 1877; application filed February 22, 1877.

*To all whom it may concern:*

Be it known that I, THEODORE GRISSINGER, of Mechanicsburg, in the county of Cumberland and State of Pennsylvania, have invented certain new and useful Improvements in Sleigh-Runners for Wagons; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This improved sleigh-runner attachment belongs to the class which are attached to the wheels of a wagon. It connects the forward and hind wheels, and it is fastened to the wheels in such a way that it can be easily and quickly attached or removed.

Figure 1:
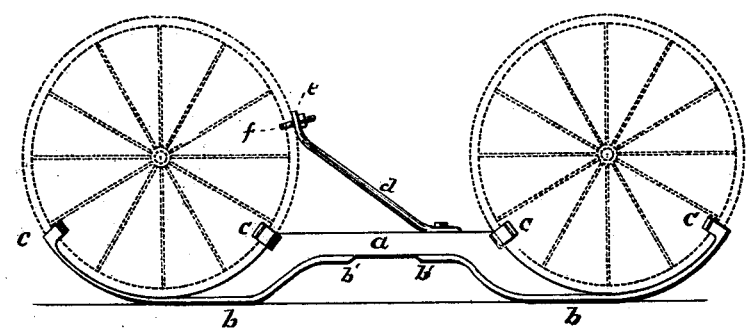
Figure 2:
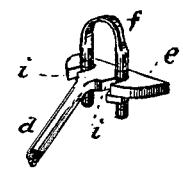

Figure 1 is a side view of one of my improved sleigh-runners, and Fig. 2 is a view of the clamp which secures the brace to the felly of the front wheel.

The body $a$ of the sleigh-runner attachment, made of wood, extends from the front to the hind wheels, and the curved iron shoes $b$ are fastened to it, one at each end. The shoe $b$ and the ends of the connecting-piece $a$ are curved and shaped so as to form seats for the wheels. Clips $c$ at the ends of the runners and also at the ends of the connecting-piece $a$ hold the sides of the wheels and keep them in place on the runners.

The shoe $b$ does not extend across from the front to the hind wheel in one straight line, but the center is raised above the level of the bearing-surface of the shoe. This may be done by making the shoe, as represented, in two pieces, one corresponding to each wheel, or they may be made in one continuous piece with the central portion bent upward, but still connecting the points $b'$ $b'$, so as to give strength and stiffness. There is less friction and the runner slides much easier when constructed in this manner than it does when it bears under its whole length.

A brace, $d$, is attached at one end to the piece $a$ in front of the hind wheel, and the other end is constructed so that it can be quickly attached to the felly of the forward wheel. A stirrup iron, $f$, passes around the felly of the wheel, and the ends of the stirrup-iron are placed in the notches or recesses $i$ of the bolt-plate $e$ on the end of the brace $d$. The nuts on the ends of the stirrup-iron $f$ bind the plate $e$ firmly to the wheel, and in attaching or removing the brace $d$ it is not necessary to unscrew the nuts entirely, but only to loosen them enough to permit the ends of the stirrup-iron to be passed into or out of the notches.

I am aware that sleigh-runner attachments for wagons which connect the wheels and are braced to the fellies of the same have been used before, and I do not claim, broadly, an attachment for that purpose as my invention.

What I do claim as my invention, and desire to secure by Letters Patent, is—

1. The combination of the connecting-piece $a$, shoes $b$ $b$, brace $d$, and stirrup-iron $f$, constructed as shown, with the center of the runner between the shoes raised, as and for the purposes set forth.

2. The combination of the brace $d$, plate $e$, constructed with the notches $i$, and stirrup-iron $f$, substantially as described, and for the purposes set forth.

In testimony that I claim the foregoing as my own I affix my signature in presence of two witnesses.

THEODORE GRISSINGER.

Witnesses:
ELI YOST,
GEORGE BOBB.